US009324205B1

(12) United States Patent
Doyen et al.

(10) Patent No.: US 9,324,205 B1
(45) Date of Patent: Apr. 26, 2016

(54) MANAGING PERSONNEL ACCESS EMPLOYING A DISTRIBUTED ACCESS CONTROL SYSTEM WITH SECURITY ENHANCEMENTS FOR IMPROVED USER AWARENESS TO AID IN DECISION MAKING

(71) Applicant: ROCKWELL COLLINS, INC., Cedar Rapids, IA (US)

(72) Inventors: William George Doyen, Annapolis, MD (US); Timothy K. Ryan, Pasadena, MD (US); Tyler Harper, Denton, MD (US); Kevin W. Traub, Owings, MD (US); Corey Rausch, Elkridge, MD (US); Kyle Hawver, Middle River, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/691,554

(22) Filed: Apr. 20, 2015

(51) Int. Cl.
*G05B 19/00* (2006.01)
*G07C 9/00* (2006.01)

(52) U.S. Cl.
CPC .................................. *G07C 9/00166* (2013.01)

(58) Field of Classification Search
CPC ...... H04L 9/32; G07C 9/00309; H04W 12/06
USPC ............................................................ 340/5.2
See application file for complete search history.

(56) References Cited

U.S. PATENT DOCUMENTS

| | | | | |
|---|---|---|---|---|
| 6,990,588 | B1 * | 1/2006 | Yasukura | G06F 21/316 713/155 |
| 2004/0259633 | A1 * | 12/2004 | Gentles | G07F 17/32 463/29 |
| 2004/0263315 | A1 * | 12/2004 | Kim | G07C 9/00087 340/5.7 |
| 2015/0221152 | A1 * | 8/2015 | Andersen | G07C 9/00309 340/5.22 |

OTHER PUBLICATIONS

U.S. Appl. No. 14/307,516 to Doyen et al., filed Jun. 18, 2014.

* cited by examiner

*Primary Examiner* — Don N Vo
(74) *Attorney, Agent, or Firm* — Ronald E. Prass, Jr.; Prass LLP

(57) ABSTRACT

A system and method are provided for implementing system controlled randomization and related functioning in screening procedures when granting individuals entry into certain limited access areas. The disclosed schemes supplement personnel access systems with additional user aware features to implement standard objective randomization processes for the selection, identification and tracking of individuals for separate levels of screening. The randomization scheme is tracked to collect information regarding the selection of individuals from the group of all individuals screened at a particular screening checkpoint to verifiably prove objective randomness in the implementation of the randomization scheme. An additional verifiable capability is provided to modify the randomization scheme locally, or from a centralized location, to adapt to changing situations while maintaining the objectivity in the scheme. These modifications can be individually directed by a system administrator, or can be automated to make them one or more of time- or event-driven.

27 Claims, 3 Drawing Sheets

MANAGING PERSONNEL ACCESS EMPLOYING A DISTRIBUTED ACCESS CONTROL SYSTEM WITH SECURITY ENHANCEMENTS FOR IMPROVED USER AWARENESS TO AID IN DECISION MAKING

This application is related to U.S. patent application Ser. No. 14/307,516 (the 516 application), entitled "SYSTEMS AND METHODS FOR IMPLEMENTING TARGETED NETWORK COMMUNICATION AND AUTOMATION CAPABILITIES IN A DISTRIBUTED ACCESS CONTROL SYSTEM," filed on Jun. 18, 2014, the disclosure of which is hereby incorporated by reference herein in its entirety.

BACKGROUND

1. Field of the Disclosed Embodiments

This disclosure relates to systems and methods for providing system controlled randomization and related functioning in screening procedures when granting individuals entry into certain limited access areas.

2. Related Art

The 516 Application describes how world events have led to ever increasing vigilance in controlling access to spaces, equipment and/or controlled communications and computing components, and this heightened vigilance has led to increasingly-sophisticated clearance procedures and systems for authorizing such access to populations of users. The enhanced vigilance is particularly acute in the areas of access to mass transportation and/or transit, particularly access to airline transportation at airports within the United States and world-wide.

Travelers are familiar with the comparatively onerous procedures and often extended delays related to passing through increasingly burdensome security checkpoints at airports. The technologic sophistication of these security checkpoints, often leads to the tremendous bottlenecks experienced at the security checkpoints.

There are ongoing efforts to streamline security procedures, such as those in airports, with objectives of reducing the levels of inconvenience and often frustration that are encountered in these common security clearance procedures. In this regard, attention has been paid to involving one or more external coordination facilities or clearinghouses in a process for pre-clearing certain individuals. The 516 Application discusses, for example, the CLEAR® system and exclusive "CLEARlanes" at airport security checkpoints that generally provide frequent travelers a system and set of procedures by which to gain pre-clearance in a manner that expedites the process.

SUMMARY OF THE DISCLOSED SUBJECT MATTER

The 516 Application notes that even these expedited screening procedures in, for example, airports tend to be cumbersome for individuals whose identities are known based on their positions, and who regularly must access the sterile areas in the airports. Such individuals include airline flight crewmembers, other airline personnel and employees, airport employees, and law enforcement/first responder personnel operating within an airport.

For flight crewmembers in particular, efforts have been made to accelerate clearance procedures based on their routine requirement to pass through security checkpoints, and a level of inherent trust in these individuals based on their employment by an airline. These efforts may generally provide a model for central clearinghouse controlled dispersed access to spaces, equipment and/or device components. The example implementation for an expedited distributed security access program discussed in the following paragraphs will help frame the basis for the disclosed exemplary embodiments. Those exemplary embodiments, as will be described in detail below, seek to leverage certain aspects of the expedited distributed security access program and the network(s) on which the program is hosted to provide a more flexible and responsive access and security system.

In airports, the Known Crew Member® ("KCM" also known as CrewPASS$^{SM}$) system allows flight crewmembers to bypass standard security screening, typically outside a normal screening area, e.g., at the exit lanes. The system includes bar-coded terminals at the airport that are connected by way of a cellular network to a centralized server in a remote clearinghouse that serves as a hub for communication with the airport terminals. The centralized server has, in turn, connectivity to participating airlines databases. The system allows for flight crewmembers to present employee identification (including employee identification number) issued by the airline with whom they are employed, and potentially including a barcode, at an alternate access point, thereby bypassing the normal security lanes.

Information entered via the bar-coded terminals is transmitted to the centralized server, which in turn contacts the particular airline by whom the individual flight crewmember is employed. In response to the database query, an approval may be generated including multiple pieces of information regarding individual flight crewmember. The individual pieces of information may include, for example, last name, first name, employee ID number, company (airline) and an image of the individual.

Alternatively, in response to the database query, a DENIED indication may be generated. The DENIED indication is understood not to necessarily indicate that there is any problem with the individual, but rather may be based on a temporary failure in connectivity to, for example, the airline database, or any other administrative issue.

Database stored information retrieved by the central server in response to a particular query is forwarded back to the bar-coded terminal in the airport to facilitate the Transportation Security Officer (TSO) or other screener comparing the information provided electronically, with the information physically presented by the individual flight crewmember (including an airline ID and a separate government issued ID). Passing this physical check at the alternate security checkpoint, the flight crewmember is allowed to pass otherwise unencumbered by additional security screening measures.

The KCM system, as currently implemented, provides a responsive, risk-based airline crewmember screening system that is currently deployed to many airports around the U.S. Currently, the KCM system is estimated to screen in excess of forty thousand airline crewmembers daily through U.S airports it supports.

According to current U.S. Transportation Security Administration (TSA) directives, airline crewmembers remain subject to random additional screening even when "cleared" by the KCM system in coordination with the airline databases. "Cleared" airline crewmembers are randomly selected for subsequent screening by the TSOs or other screeners manning the KCM crew entry points (alternate access points). This is currently a manual function performed by the TSOs based on guidelines and parameters provided by the TSA.

This additional screening is considered by administrators of the streamlined security processes to remain an essential part of an appropriately layered security approach. While aware of the additional procedures and potential for selection, individuals seeking expedited clearance may often have issues with the process as it is implemented on any given day and express frustration with being "selected" for additional screening. Individuals, disgruntled with the process, may allege, for example, that they are somehow being inappropriately "singled out" by the typically subjective process undertaken in implementing the randomization. As such, the manual random selection process today has limitations and inefficiencies.

Once selected for additional screening a crewmember does not have the option to not undergo the extra screening. But for example some crewmembers when selected for additional screening have elected to just go to another KCM access point in the airport and to "try their luck" there while others have gone to the bathroom and changed clothes into their airline uniform in an effort to go through the same checkpoint at a different time and with a look that is different enough not to arouse the suspicion of the TSO.

Whether it is an assertion of being targeted for random screening based on the individual's perception of some "unfair" or incorrectly administered criteria, or there is active deception undertaken in trying to avoid the additional screening, there is essentially no manner existing today by which to rebut the assertions or catch the offenders in any meaningful way.

The current randomization, which may be based on individual airport policy, and vary according to individual screener attention to, and execution of, the policy, may appear to be implemented differently at different alternate security checkpoints in different airports on different days, i.e., not standard system wide or even within a particular airport. Awareness of this non-uniformity can lead to the dissatisfaction of the selected individuals. This dissatisfaction can, in turn, escalate to confrontation between the selected individuals and the screeners and, in cases, may cause certain disaffected individuals to take the above-described, or other like, steps to avoid the additional screening.

The ability to engage in such subterfuge, for example exists because, in many cases, when an individual is randomly singled out for additional screening, that individual may simply be directed to the normal (standard) security lanes in the airport. The individual may be told that he or she has been cleared through the system, but has been separately randomly selected for the additional screening. More often, however, the individual is just informed that he or she is simply "not cleared" for passage via the expedited procedure at the alternate security checkpoint. The individuals' response, knowing that he or she was previously cleared on that day at another facility may be frustration leading to confrontation nonetheless. Typical claims of some type of bias may be a part of the response of certain of these individuals.

Once informed, follow-up may be problematic to undertake to "track" what the once-randomly-identified individual does next, e.g., whether he or she does, in fact, submits to regular screening.

Because the conventional randomization process for additional screening is manual and human-involved, there is no particular artifact or data capture to objectively disprove accusations of bias by disgruntled individuals, or to "catch" the active offenders. A difficulty in identifying such actions is that there is currently no immediate information sharing capability between the various alternate security checkpoints in a particular airport.

Based on the above shortfalls in conventional screening procedures and current implementations of the automated system known as KCM, it may be advantageous to provide a system-implemented process by which randomization of an additional screening scheme is undertaken in an objectively neutral manner by substantially removing the human subjective selection elements from the scheme. Benefits of such a scheme would include an ability to archive identification of individuals selected for additional screening in a manner that (1) provides verifiable data regarding the selection process and the truly objective nature of the selection process in its implementation to withstand challenge, and (2) provides a communication scheme by which to share data on such screened personnel with all applicable stakeholders immediately in an effort to reduce instances of individuals attempting to "beat the system."

Exemplary embodiments of the systems and methods according to this disclosure may supplement personnel access systems with additional user aware features to implement standard objective randomization processes for the selection, identification and tracking of individuals for separate levels of screening.

Exemplary embodiments may provide enhanced security in access systems, such as the current KCM system, through information storage and retrieval including improved awareness of staff/crew (screeners) to aid decision making in part with the integration of an automated "randomizer" capability. In embodiments, improving an in place security system with the disclosed elements and schemes is intended to provide a more secure, effective and efficient system for streamlined personnel access to secure areas.

Exemplary embodiments may "lock-in" a particular randomization scheme to be used for a particular period of time and collect information regarding the selection of individuals from the group of all individuals screened at a particular screening checkpoint to verifiably prove objective randomness in the implementation of the randomization scheme.

Exemplary embodiments may provide a verifiable capability to modify the randomization scheme locally, or from a centralized location, to adapt to changing situations while maintaining the objectivity in the implementation of the scheme. These modifications may be individually directed by, for example, a system administrator, or may be automated in a manner that makes them one or more of time or event driven.

Exemplary embodiments may provide a capability by which information regarding individuals selected for differentiated-screening may be shared with appropriate stakeholders including other screeners staffing other checkpoints to provide local or system-wide identification of such differentiated-screening individuals in an effort to preclude those individuals from circumventing the randomization process for differentiated screening.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for providing for providing system controlled randomization and related functioning in screening procedures when granting individuals entry into certain limited access areas, will be described, in detail, with reference to the following drawings, in which.

DESCRIPTION OF THE DISCLOSED EMBODIMENTS

Figure 1:
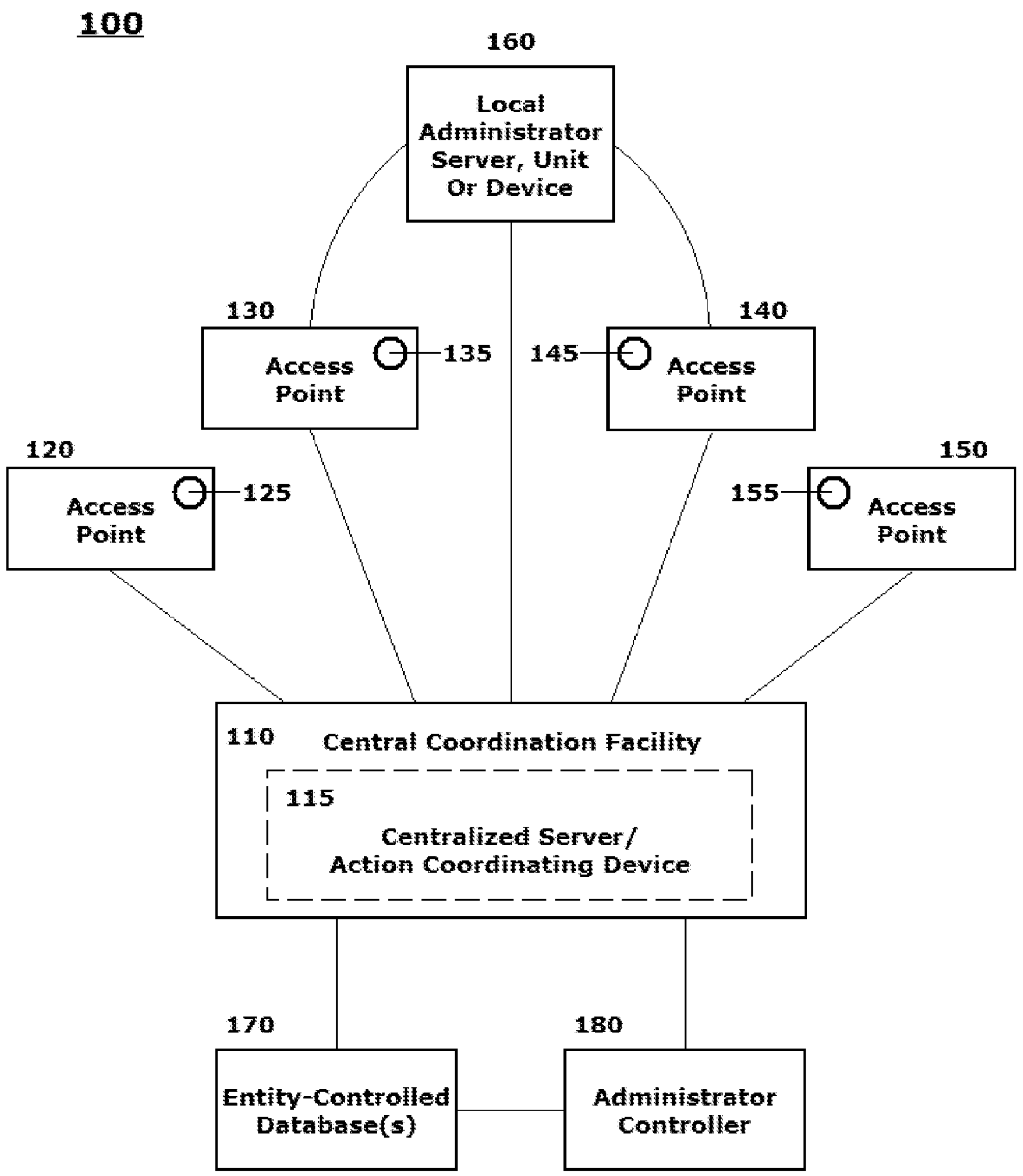
FIG. 1 illustrates an exemplary overview of an operating environment in which the individual personnel access, randomization and information sharing schemes according to this disclosure may be implemented.

The disclosed systems and methods for providing for providing system controlled randomization and related functioning in screening procedures when granting individuals entry into certain limited access areas, will generally refer to this specific utility for those systems and methods. Exemplary embodiments will be described in this disclosure as being particularly adaptable to use in airport environments for streamlined screening procedures and layered security procedures that are applicable to expediting the flow of "cleared" individuals through the airport environments. An ability to provide a verifiable randomization and information sharing system in the manner disclosed may be particularly beneficial to addressing perceived shortfalls in current implementations for security access. These descriptions, and particularly a detailed review of a single communication and employment scenario, should not be interpreted as specifically limiting the disclosed schemes to any particular situation or occurrence, operating scenario, and/or configuration of a networked communicating system for carrying into effect the disclosed schemes. In fact, the systems and methods according to this disclosure may be equally applicable to any person-in-the-loop or automated security procedure that an individual may use for gaining access to controlled spaces, pieces of equipment and/or computing or communicating device components in which the individual's access may include an additional layer of security provided through a randomization scheme directed at keeping everyone honest. Any ability to implement and enforce an objective, rather than a subjective, randomization scheme that may benefit from even partial implementation of the systems, techniques, processes and/or schemes discussed in detail below is contemplated as being covered by this disclosure.

Specific reference to, for example, the above-discussed scenario for clearance, tracking and management of individual differentiated individuals selected at random for additional screening as a particular real-world example of where the systems and methods according to this disclosure may be particularly advantageously employed should be understood as being exemplary only, and not limiting the disclosed schemes, in any manner, to any particular class of individuals, any particular types of facilities, or any particular communication link or protocol for implementing the disclosed schemes.

Features and advantages of the disclosed embodiments will be set forth in the description that follows, and in part will be obvious from the description, or may be learned by practice of the disclosed embodiments. The features and advantages of the disclosed embodiments may be realized and obtained by means of the instruments and combinations of features particularly pointed out in the appended claims.

Various embodiments of the disclosed systems and methods are discussed in detail below. While specific implementations are discussed, it should be understood that this is done for illustration purposes only. A person skilled in the relevant art will recognize that other components and configurations may be used without departing from the spirit and scope of the disclosed embodiments.

KCM, in a current installation, is essentially limited to making a flight crewmember passage via a particular streamlined access protocol authorized or non-authorized. The network, however, provides a significant capacity for growth, particularly because it is in-place, with the required central coordination facility and network communication backbone, at this time. In installations, the disclosed schemes propose to provide a particular improvement by which information regarding random additional screening selections is collected and stored for immediate information to stakeholders and for immediate or delayed analysis.

As the actual selection for referral for random subsequent screening is currently being made by human beings manning the KCM crew entry points, it can be potentially less random than what is desired. Automating and integrating this function into the Known Crewmember computer system should help to streamline this selection process and improve the fidelity of the selection.

Manual random selection occurs today. Once selected/identified for additional screening, there is no option for the individual to not participate. Movements of the individual may be problematic or impractical to monitor in certain circumstances. As a result, there are a certain number of individuals who, once identified for additional screening, may not return to regular security checkpoints to subject themselves to standard non-streamlined screening. The most egregious offenders may, for example, make attempts to limitedly change their appearance in an effort to re-present themselves to an alternate security checkpoint in an attempt to gain expedited screening, while avoiding the selection for additional screening thereby thwarting the randomization process. Such individual attempts at circumvention may subject the individual to civil and criminal liability and/or administrative processing by, for example, the airline that employs the individual. The information collection and sharing schemes are intended to address these circumstances.

Separately, the disclosed automated schemes may allow an administrator (as a sort of "super user") to determine that, for a given period, a particular percentage of the individuals that present themselves for expedited screening to be identified for additional screening. The administrator may, via communication through a central clearinghouse for example, target a particular region or facility for a different percentage based on information that may suggest that a heightened level of vigilance may be appropriate for the particular region or facility without otherwise burdening the system. A compilation of information may separately be provided to an automated scheme from a number of selectably relevant sources to provide objective selection of criteria to be used, given individual events and local circumstances in a particular region or within a certain facility or group of facilities. A time modified/modifiable scheme may also be implemented. In general, the disclosed schemes may provide a modifiable and verifiable process for machine implementing a randomization scheme that essentially takes the individual screener out of the process.

The automation of the implementation of heightened screening processes may be information driven and targeted based on information insights for a given region, facility, time or the like. Such implementation may provide and archive verifiable background information upon which the screening procedures are locally modified to avoid accusations of profiling or targeting, for example. These schemes remove, or at least reduce, the opportunity for individual errors in implementation that allow circumstances to lead to accusations of individual or system bias in the selection processes.

The disclosed schemes may additionally provide directed communication of identifying information for a selected individual to all of the local regular and alternate screening checkpoints in order that screeners at each of these checkpoints may be alerted to the fact that a particular individual has been randomly selected for additional screening. In this manner, an individual, whose subsequent actions within a particular facility are not constantly tracked may not avoid heightened screening by, for example, presenting himself or herself to another expedited screening checkpoint and failing to identify himself or herself as an individual who has been selected for additional screening by the random procedure in place within the facility at the particular time.

Implementation of such a communication scheme between locally-accessible screening checkpoints may provide an additional level of deterrence to those individuals who may selectively choose to attempt to circumvent the-screening procedures in place within the facility and administered through the disclosed objective randomization schemes. Alternatively, actions taken to avoid the scheme by those individuals who remain undeterred may be identified, recorded, and the individuals sidelined for additional civil, criminal or administrative processing as appropriate to the local circumstances and the conditions by which they are allowed to participate in generally expedited screening. An advantage of the disclosed schemes is that the data collection and archiving capabilities may likely provide a substantial record of the events and occurrences surrounding the individuals attempt to circumvent the process such that an evidentiary basis for the imposition of appropriate sanctions may be provided.

In the above regards, all of the data generated regarding individuals involved in the expedited screening, and those individuals randomly selected for additional screening, may be collected and archived for later analysis to include, for example, to address situations in which the "randomness" of the selection process may be challenged, or as outlined above, situations in which a "randomly-selected" individual attempts to circumvent the random selection process. Everything that happens in the system may be recordable and storable for use in generating all manner of analysis and reporting as may be required or desired by any individual stakeholder.

The following functionalities may implement the enhanced security capabilities and information storage and retrieval, including improved awareness of staff/crew to aid decision making:

- A randomization algorithm in the expedited access control system may choose whether a particular individual clearing through an access point is referred for additional screening.
- A randomly-selected individual chosen for additional screening may be indicated on an access management display component available to the screener as "Approved" with referral for additional screening.
- A random screening percentage parameter may be configurable by facility (airport) by an administrator (e.g., a TSA KCM Administrator at each airport) or at a global system-wide level.
- Virtually any data option may be used to provide a basis of the random selection, including: that could be added to the system include: characteristics of an individual's name (by specific letters, a number of letters, and the like); a particular airline; an employee number; a destination airport; and/or other like selectable option (individually or in combination).
- A limited number of "super users" may be provided the ability to alter the minimum system wide level as well as at regional or specific airport locations. If a crewmember goes through multiple access entry points while he or she is in the Approved with referral for subsequent screening status, that individual should only be counted once toward the screening percentage.
- An identification of an individual, such as an administrator, modifying a screening level locally at a facility (such as an airport) will be recorded, with such additional tracking information as is appropriate including, for example, a time and date of the change.
- A result code for each individual requesting access, for example, indicating Approved, Denied, or Approved with referral for subsequent screening, may be recorded by the access control system along with the location and time of the access request.
- An individual in an Approved with referral for subsequent screening status may remain indicated as such for a specified period of time before the information on such status is automatically purged from the system. The period of time may be, for example, 30 minutes and may be locally adjustable of configurable for access control system as a whole.

FIG. 1 illustrates an exemplary overview of an operating environment 100 in which the individual personnel access, randomization and information sharing schemes according to this disclosure may be implemented. As shown in FIG. 1, the exemplary operating environment 100 may encompass myriad lines of communication (wired or wireless) between a central coordination facility 110, acting as a type of central clearing house, and a number of widely dispersed nodes.

The widely dispersed nodes may include a plurality of access points 120,130,140,150, which may be broadly geographically dispersed for providing access, at some level of an access control threshold, to one or more access-controlled spaces, one or more access-controlled pieces of equipment and/or one or more access-controlled communicating or computing device components. In groups, one or more of the plurality of access points 120,130,140,150 may be geographically, or institutionally, co-located. In such circumstances, as is shown in FIG. 1, a local administrator server, unit or device 160 may exercise some level of local administrative control over the geographically, or institutionally, co-located access points 130,140. One or more of the plurality of access points 120,130,140,150, may be comprised of a fixed or mobile communicating/computing device, which may have associated with it an installed, or closely positioned, camera 125,135,145,155. The camera 125,135,145,155 may be positioned with its field of view capable of recording identification of individuals in a vicinity of the one or more of the plurality of access points 120,130,140,150. An objective of such camera positioning may be to obtain contemporaneous images of individuals presenting themselves for access through one of the plurality of access points 120,130,140, 150, the images to be immediately shareable among stakeholder entities and between others of the plurality of access points 120,130,140,150.

An automated random selection of a subset of the individuals presenting themselves to each of the plurality of access points 120,130,140,150 may result in an individual being cleared ("Approved") according to the implemented clearing processes, but also being referred for subsequent screening.

Under such conditions, a manual trigger or an automated triggering algorithm or scheme may be employed to causing the appropriate one of the cameras 125,135,145,155 to activate to capture a current identifying image of the Approved and referred for subsequent screening individual. The current identifying image along with the Approved individual identifying information may be shared for some predetermined period of time among all of the others of the locally-positioned plurality of access points 120,130,140,150 and with the local administrative server, unit or device 160.

The widely-dispersed nodes may also include a one or more entity-controlled database(s) 160. These databases may include company-controlled employee registers, or other individual registration lists, including, for example, government-maintained "no-fly" or other access control lists, by which the entity controlling any particular one of the databases may provide information regarding employee or other individual access authorization (or non-authorization) upon request. A premise behind the disclosed access control schemes is that no single entity may appropriately collect and hold the individual access authorization verification data as tightly as an originating entity that has a vested interest in most tightly controlling its own access verification information, and/or that there are competing or overlapping requirements regarding access control to any one or more of a particular space, piece of equipment, and/or communicating or computing device component. The originating entities are advantageously aided by the intervening clearing house structure in the form of the central coordination facility 110 that receives the access requests via a centralized server/action coordinating device 115 and accesses the various databases to fulfill or respond to the access requests. In the disclosed embodiments, the central coordination facility 110 may be additionally employed, as discussed below, in a support role for collecting additional information from each one the access points 120,130,140,150 for immediate dissemination or for later analysis and/or other like purposes.

The central coordination facility 110 may comprise a proprietary communication integration methodology by which information from myriad stakeholders may be coordinated according to a particular menu of responses. The central coordination facility 110 via the centralized server/action coordinating device 115 may additionally be in contact with some external administrator by, for example, an administrator controller 180 that may set externally-controlled parameters for the execution of the disclosed access control and additional access randomization security control schemes. Parameters for the randomization scheme as is discussed above may be set by the administrator controller 180 for system-wide implementation. Separately, the local administrator server, unit or device 160 may add additional layers of randomization as may be appropriate.

An automated scheme for randomization implementation may be implemented by, for example, the administrator controller 180 or the centralized server/action coordinating device 115 communicating directly with one or more entity controlled databases 170 that may be usable to provide information to the network regarding reasons by which to modify a randomization schedule/implementation in one or more facilities, one or more regions encompassing multiple facilities, or system-wide.

The centralized server/action coordinating device 115 may be usable to provide targeted dissemination of captured images of individuals that are Approved but referred for subsequent screening in an effort to reduce instances of those individuals attempting to circumvent the system by them minimally changing their appearance and then presenting themselves at one of the plurality of access points 120,130, 140,150 that was not the one of the plurality of the access points 120,130,140,150 at which they were initially referred for subsequent screening.

Figure 2:
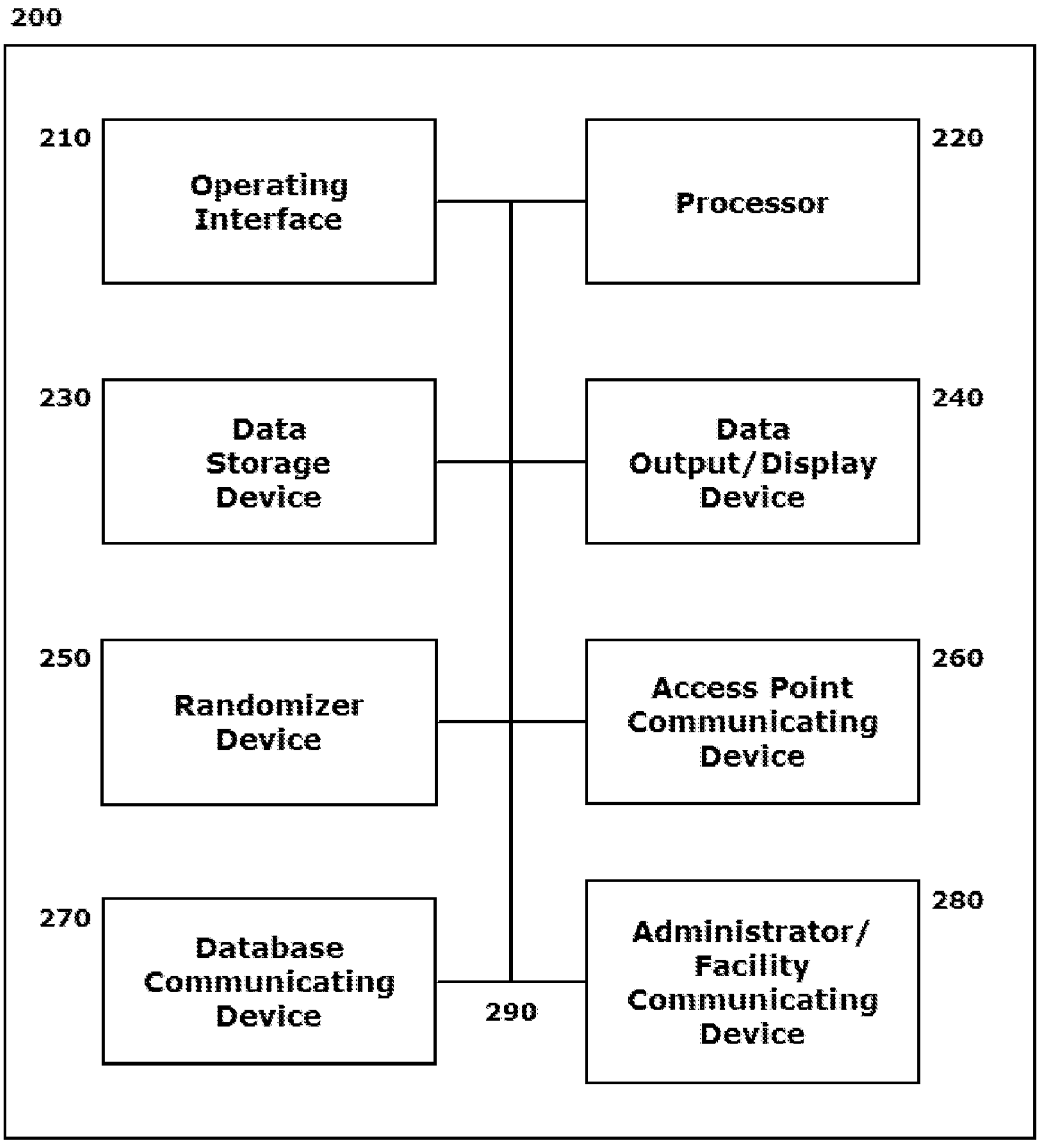
FIG. 2 illustrates an exemplary data collection, analysis and communicating system, components of which may be housed in a central coordination facility for implementing network-connected individual personnel access, randomization and information sharing schemes according to this disclosure.

FIG. 2 illustrates an exemplary data collection, analysis and communicating system 200, components of which may be housed in a central coordination facility for implementing network-connected individual personnel access, randomization and information sharing schemes according to this disclosure. The exemplary system 200 shown in FIG. 2 may be implemented as a unit in the central coordination facility (element 110 in FIG. 1), or may be implemented as a combination of system components associated with the central coordination facility, including as cloud-based processing and data storage components.

The exemplary system 200 may include an operating interface 210 by which a user may communicate with the exemplary system 200 for directing operations of the exemplary system 200 in implementing the disclosed network-connected individual personnel access, randomization and information sharing schemes. The user interface 210 may be usable to aid in directing personnel verification and information sharing between a central coordination facility and a plurality of connected nodes (as shown generally in FIG. 1 and described in detail above). Control, coordination communication inputs received in the exemplary system 200 via the operating interface 210 may be processed and communicated to any one or more of the many connected nodes in communication with the central coordination facility. The operating interface 210 may be a part or a function of a graphical user interface (GUI) mounted on, integral to, or associated with, the exemplary system 200. The operating interface 210 may alternatively take the form of any commonly user-interactive device by which user inputs and/or commands are input to an automated processing system including, but not limited to, a keyboard or a touchscreen, a mouse or other pointing device, a microphone for providing verbal commands, or any other commonly-known operating interface device.

The exemplary system 200 may include one or more local processors 220 for carrying out the individual operations and functions of the exemplary system 200. The processor 220 may reference, for example, each communication with one or more security access points to determine whether the communication involves an access query to be coordinated via the exemplary system 200, or the communication provides information to supplement stored information in, for example, local storage device 230 regarding individual personnel identification and access clearance events in the manner described in detail above. The processor 220 may direct storing of the additional information, or communication of any query or any additional information to appropriate databases and/or stakeholders to carry into effect the individual access verification functions and randomization implementation for a layered security structure according to the disclosed schemes.

The processor 220 may coordinate responses to individual access requests, implement a randomization scheme according to local or remote administrator instructions and control data collection and dissemination with respect to individuals whose clearance credentials are accepted and verified but whom are selected for addition screening according to the random selection protocol or algorithm executed by, for example, randomizer device 250.

The exemplary system 200 may include one or more data storage devices 230. Such data storage device(s) 230 may be used to store data or operating programs to be used by the exemplary system 200, and specifically the processor(s) 220 in carrying into effect the disclosed operations and functions. Data storage device(s) 230 may be used to store information regarding implementation of a particular randomization scheme over time to prove, when necessary that the automated randomization scheme, as implemented in any particular facility for any particular interval of time is truly random. The data storage device(s) 230 may also be used to store data on individual clearance and randomized enhanced security events to include identification of approved individuals selected for additional screening and collectible information on the reaction of those individuals to the selection and/or the compliance of those individuals with the additional security screening requirements.

The data storage device(s) 230 may include a random access memory (RAM) or another type of dynamic storage device for storing updatable database information, and for separately storing instructions for execution of system operations by, for example, processor(s) 220. Data storage device (s) 230 may also include a read-only memory (ROM), which may include a conventional ROM device or another type of static storage device that stores static information and instructions for processor(s) 220. Further, the data storage device(s) 230 may be integral to the exemplary system 200, or may be provided external to, and in wired or wireless communication with, the exemplary system 200, including as cloud-based storage and/or processing elements.

The exemplary system 200 may include at least one data output/display device 240, which may be configured as one or more conventional mechanisms that output information to a user, including, but not limited to, a display screen on a GUI associated with the exemplary system 200 to provide feedback to an operator of the exemplary system 200 regarding, for example, system health and a translation of information via the exemplary system 200 to one or more of the widely-dispersed nodes with which the exemplary system 200 communicates.

The exemplary system 200 may include a particular randomizer device 250 for executing a randomization scheme in the exemplary system 250. The randomization scheme may be executed based on stored randomization procedures and data structures. Alternatively, the randomization scheme may be executed based on local or remote inputs from, for example, a system administrator. The local system administrator may communicate with the exemplary system 200 via the user interface 210. The remote system administrator may communicate with the exemplary system 200 via a separate administrator/facility communicating device 280.

The exemplary system 200 may include a plurality of individual communicating devices 260-280 that may be individually configured to provide direct communication particularly to individual ones of the multiplicity of external nodes according to a particular communicating capabilities with those external nodes. The individual communicating devices may include, for example, an access point communicating device 260, the database communicating device 270, and the administrator/facility communicating device 280.

The access point communicating device 260 may be particularly configured to receive and respond to access queries sent by all of the access points connected to the exemplary system 200. In such instances, input information may be received and the processor 220 may make a determination as to whether to store the received information locally in a data storage device 230, or otherwise to query an external database via, for example, the database communicating device 270 to obtain access verification information on a particular individual based on the query received from the connected access points.

The administrator/facility communicating device 280 may be particularly configured to exchange randomization and control inputs from one or more local administrator facilities and/or a facility in which an overarching system randomization administrator (super user) may be housed.

All of the various components of the exemplary system 200, as depicted in FIG. 2, may be connected internally, and potentially to a central coordination facility, by one or more data/control busses 290. These data/control busses 290 may provide wired or wireless communication between the various components of the exemplary system 200, whether all of those components are housed integrally in, or are otherwise external and connected to, other components of an overarching access control system with which the exemplary system 200 may be associated.

It should be appreciated that, although depicted in FIG. 2 as an essentially integral unit, the various disclosed elements of the exemplary system 200 may be arranged in any combination of sub-systems as individual components or combinations of components, integral to a single unit, or external to, and in wired or wireless communication with, the single unit of the exemplary system 200. In other words, no specific configuration as an integral unit or as a support unit is to be implied by the depiction in FIG. 2. Further, although depicted as individual units for ease of understanding of the details provided in this disclosure regarding the exemplary system 200, it should be understood that the described functions of any of the individually-depicted components may be undertaken, for example, by one or more processors 220 connected to, and in communication with, one or more data storage device(s) 230, all of which may support operations in the associated access control system.

Figure 3:
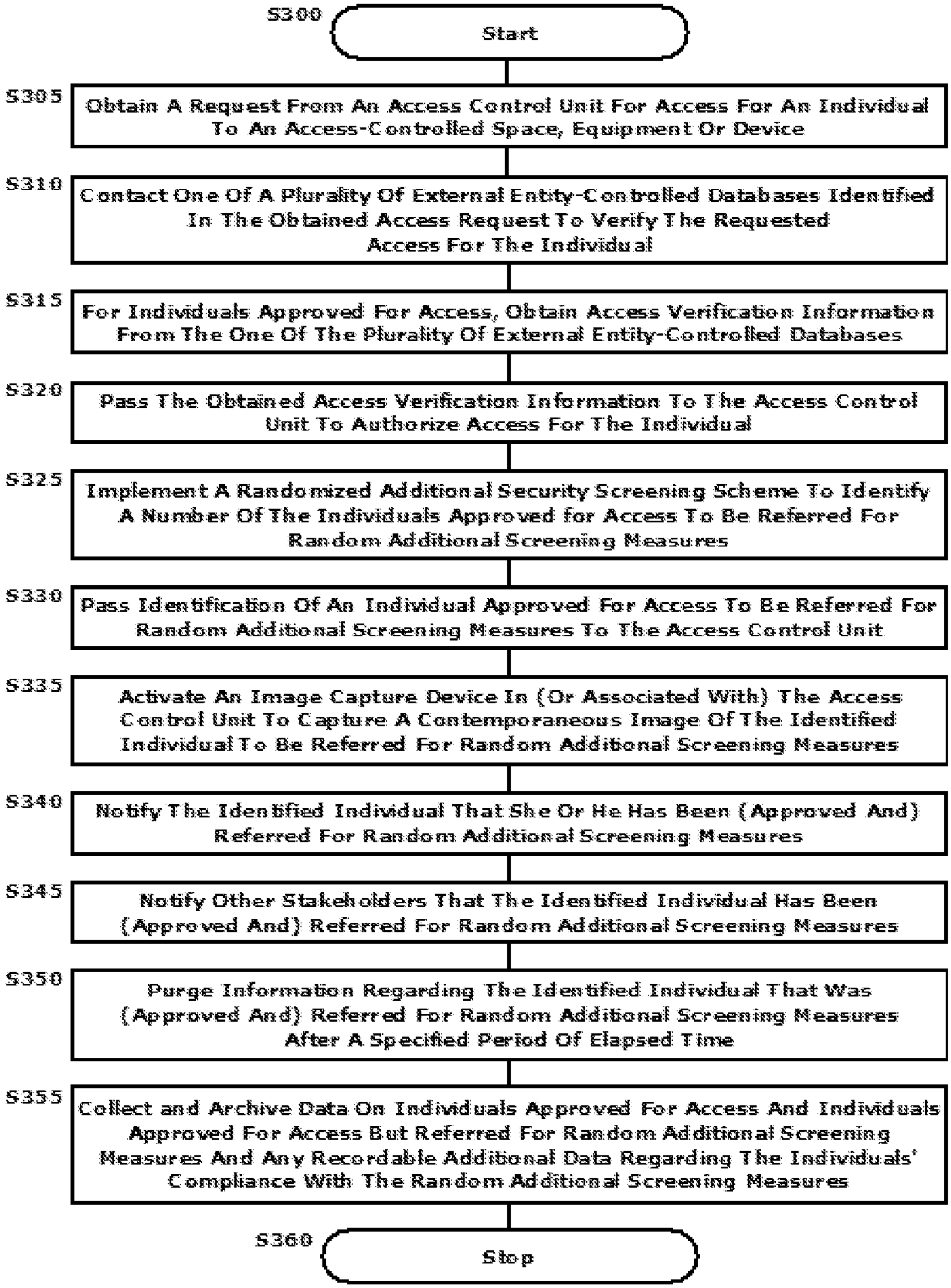
FIG. 3 illustrates a flowchart of an exemplary method for implementing network-connected individual personnel access, randomization and information sharing schemes according to this disclosure.

The disclosed embodiments may include an exemplary method for implementing network-connected individual personnel access, randomization and information sharing schemes. FIG. 3 illustrates an exemplary flowchart of such a method. As shown in FIG. 3, operation of the method commences at Step S300 and proceeds to Step S305.

In Step S305, a request for access for an individual to an access-controlled space, equipment or device may be received from an access control unit. Operation of the method proceeds to Step S310.

In Step S310, a one of a plurality of external entity-controlled databases specifically identified in the obtained access request may be contacted to verify the requested access for the individual. Operation of the method proceeds to Step S315.

In Step S315, for individuals approved for access, access verification information may be obtained from the one of the plurality of external entity-controlled databases. Operation of the method proceeds to Step S320.

In Step S320, the obtained access verification information from the one of the plurality of external entity-controlled databases may be passed to the access control unit from which the request was received to authorize access for the individual. Operation of the method proceeds to Step S325.

In Step S325, a randomized additional security screening scheme may be implemented to identify a number of the individuals approved for access to be referred for random additional screening measures. Operation of the method proceeds to Step S330.

In Step S330, identification of an individual approved for access but who is selected to be referred for random additional screening measures may be passed to the access control unit at which the individual presented themselves to request access. Operation of the method proceeds to Step S335.

In Step S335, a an image capture device that may be, for example, integral to, or otherwise associated with, the access control unit may be automatically or manually activated to capture a real-time image of an identified individual approved for access but who is separately to be referred for random additional screening measures according to the implemented randomization scheme. Operation of the method proceeds to Step S340.

In Step S340, the identified individual may be notified that she or he has been approved and referred for random additional screening measures. In embodiments, the approval may not be communicated to the individual. Rather, the individual may only be told that she or he has been referred for the random additional screening measures. Operation of the method proceeds to Step S345.

In Step S345, other stakeholders including, but not limited to, other access control unit in a vicinity of the access control unit to which the individual presented themselves to obtain access may be notified that the identified individual has been approved and has been referred for random additional screening measures. Manual or automated tracking of the individual may be undertaken in order to attempt to ensure that the identified individual voluntarily submits herself or himself to the random additional screening measures. Operation of the method proceeds to Step S350.

In Step S350, upon the lapse of a specified period of time after identification of the individual and notification of other stakeholders, the period of time coinciding with an expected opportunity for the individual to submit to the random additional screening measures, information regarding the identified individual that was approved and referred for the random additional screening measures may be purged from the system. Such automated purging allows for the system to not become overwhelmed with storing unnecessary data regarding individuals who, by the expiration of the elapsed time, should reasonably have submitted to the random additional screening measures or otherwise avoided the random additional screening measures, thereby setting themselves up for being subject to civil, criminal or administrative action as appropriate. Operation of the method proceeds to Step S355.

In Step S355, data on individuals approved for access, and moreover on individuals approved for access but referred for random additional screening measures, as well as any recordable additional data regarding the individuals' compliance with the random additional screening measures, or conversely efforts to evade the random additional screening measures, may be collected and archived for later analysis. Such analysis may be appropriate when any individual alleges that the screening procedure was not, in that individual's impression, objectively random. Such analysis may also be appropriate when individual attempts to circumvent the random additional screening measures thereby subjecting the individual to other action. The stored information may provide the evidence necessary to support the taking of civil, criminal or administrative action with regard to the individual who attempted to evade the random additional screening measures. Operation of the method proceeds to Step S360, where operation of the method ceases.

The disclosed embodiments may include a non-transitory computer-readable medium storing instructions which, when executed by a processor, may cause the processor to execute all, or at least some, of the functions that may be appropriate to implementing the steps of the method outlined above.

The above-described exemplary systems and methods reference certain conventional communicating and/or computing components to provide a brief, general description of suitable operating environments in which the subject matter of this disclosure may be implemented for familiarity and ease of understanding. Although not required, embodiments of the disclosed systems, and implementations of the disclosed methods, may be provided and executed, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in integrating access control techniques using many and widely-varied system components.

The exemplary depicted sequence of executable instructions or associated data structures represent one example of a corresponding sequence of acts for implementing the functions described in the outlined steps. The exemplary depicted steps may be executed in any reasonable order to carry into effect the objectives of the disclosed embodiments. No particular order to the disclosed steps of the method is necessarily implied by the depiction in FIG. 3, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure. It will be appreciated that various of the above-disclosed and other features and functions, or alternatives thereof, may be desirably combined into many other different systems or applications. Although the above description may contain specific details, they should not be construed as limiting the claims in any way. Other configurations are part of the scope of the disclosed embodiments. For example, the principles of the disclosed embodiments may be applied to each individual access unit in a manner that enables each access unit and/or personal electronic device to enjoy the benefits of the disclosed embodiments even if any one of the large number of possible end-user nodes do not need some portion of the described functionality. In other words, there may be multiple instances of the disclosed system each processing the content in various possible ways. It does not necessarily need to be one system used by all end-user nodes. Accordingly, the appended claims and their legal equivalents should only define the disclosed embodiments, rather than any specific examples given.

We claim:

1. A system for implementing access control, comprising:

a communication hub that communicates with (1) a plurality of access control checkpoint components that are used by individuals to gain access to an access-controlled space, and (2) a plurality of remote databases, at least one of the plurality of remote databases (a) being separately controlled by an access control entity and (2) containing information maintained by the access control entity for individual access verification;

an access resolution device that receives an access request from a first one of the plurality of access control checkpoint components, the access request including identifying information for the individual, and identifying information for one of the plurality of remote databases containing the information for the individual access verification, queries the one of the plurality of remote databases containing the information for the individual access verification according to the identifying information in the access request, and forwards access verification information for the individual received in response to the query to the first one of the plurality of access control checkpoint components; and a randomizer device that implements a random selection scheme that selects a subset of individuals whose access is authorized for additional access verification; and passes selection information to the first one of the plurality of access control checkpoint components.

2. The system of claim 1, wherein the selection information is forwarded to at least a second one of the plurality of access control checkpoint components.

3. The system of claim 2, wherein identification information for the individual associated with the selection information is forwarded to the at least the second one of the plurality of access control checkpoint components.

4. The system of claim 3, wherein the identification information for the individual associated with the selection information includes an image of the individual captured with an image capture device associated with the first one of the plurality of access control checkpoint components.

5. The system of claim 2, wherein the at least the second one of the plurality of access control checkpoint components is located proximately to the first one of the plurality of access control checkpoint components and is used by individuals to gain access to a same access-controlled space within a facility.

6. The system of claim 5, wherein the selection information is forwarded to a central administration server for display to a local administrator exercising control over access to access-controlled spaces within the facility.

7. The system of claim 2, wherein the selection information is forwarded to the at least the second one of the plurality of access control checkpoint components in response to an input received via a user interface from a user of the first one of the plurality of access control checkpoint components receiving the selection information.

8. The system of claim 1, the random selection scheme establishing a baseline percentage of the individuals whose access is authorized for the additional access verification.

9. The system of claim 8, the baseline percentage being set based on an input received from a remote system administrator.

10. The system of claim 8, the baseline percentage being modified to a higher percentage based on an automated assessment of threat information from one or more external data sources received via the communication hub.

11. The system of claim 8, the baseline percentage being modified to a higher percentage based on an input received from a local administrator exercising control over access to access-controlled spaces within a particular facility.

12. The system of claim 1, further comprising a data storage device storing data regarding at least (1) identification of all individuals whose access is authorized and (2) identification of all individuals (a) whose access is authorized and (b) that the randomization scheme then selects for additional access verification.

13. A method for implementing access control, comprising:

receiving, with a processor, an access authorization request from at least a first one of a plurality of access control checkpoint components, the access authorization request identifying an individual requesting access and identifying information for one of a plurality of remote databases containing information for individual access verification, the identified one of the plurality of remote databases (1) being separately controlled by an access control entity registering access control information for a group of individuals and (2) containing information maintained by the access control entity for individual access verification;

forwarding, with the processor, a query to the identified one of the plurality of remote databases containing the information for the individual access verification;

forwarding, with the processor, access verification information for the individual received in response to the query to the at least first one of the plurality of access control checkpoint components from which the access authorization request is received;

executing, with the processor, a random individual selection scheme that selects a subset of individuals whose access is authorized for additional access verification; and passing selection information to the first one of the plurality of access control checkpoint components.

14. The method of claim 13, further comprising forwarding the selection information to at least a second one of the plurality of access control checkpoint components.

15. The method of claim 14, further comprising forwarding identification information for the individual associated with the selection information to the at least the second one of the plurality of access control checkpoint components.

16. The method of claim 15, further comprising:

capturing an image of the individual with an image capture device associated with the first one of the plurality of access control checkpoint components; and forwarding the captured image of the individual with the identification information for the individual associated with the selection information to the at least the second one of the plurality of access control checkpoint components.

17. The method of claim 14, the at least the second one of the plurality of access control checkpoint components being located proximately to the first one of the plurality of access control checkpoint components and being used by individuals to gain access to a same access-controlled space within a facility.

18. The method of claim 17, further comprising forwarding the selection information to a central administration server for display to a local administrator exercising control over access to access-controlled spaces within the facility.

19. The method of claim 14, further comprising:

receiving an input from a user of the first one of the plurality of access control checkpoint components receiving the selection information; and forwarding the selection information to the at least the second one of the plurality of access control checkpoint components in response to the received input.

20. The method of claim 13, the random selection scheme establishing a baseline percentage of the individuals whose access is authorized for the additional access verification.

21. The method of claim 20, further comprising receiving, with the processor, an input from a remote system administrator to set the baseline percentage.

22. The method of claim 20, further comprising:

receiving, with the processor, threat information from one or more external data sources via a communication hub; and modifying the baseline percentage, with the processor, to a higher percentage based on an automated assessment of the received threat information.

23. The method of claim 20, further comprising:

receiving, with the processor, an input from a local administrator exercising control over access to access-controlled spaces within a particular facility; and modifying the baseline percentage, with the processor, to a higher percentage based on the input from the local administrator.

24. The method of claim 13, further comprising storing in a data storage device data regarding at least (1) identification of all individuals whose access is authorized and (2) identification of all individuals (a) whose access is authorized and (b) the randomization scheme then selects for additional access verification.

25. The method of claim 24, further comprising:

analyzing, with the processor, the stored data to establish a random nature of selections made by the randomization scheme in response to an inquiry; and reporting a result of the analysis to an entity initiating the inquiry.

26. A non-transitory data storage medium storing instructions that, when executed by a processor, cause the processor to execute the steps of a method for implementing access control, the method comprising:

receiving an access authorization request from at least a first one of a plurality of access control checkpoint components, the access authorization request identifying an individual requesting access and identifying information for one of a plurality of remote databases containing information for individual access verification, the identified one of the plurality of remote databases (1) being separately controlled by an access control entity registering access control information for a group of individuals and (2) containing information maintained by the access control entity for individual access verification;

forwarding a query to the identified one of the plurality of remote databases containing the information for the individual access verification;

forwarding access verification information for the individual received in response to the query to the at least first one of the plurality of access control checkpoint components from which the access authorization request is received;

executing a random individual selection scheme that selects a subset of individuals whose access is authorized for additional access verification;

passing selection information to the first one of the plurality of access control checkpoint components.

27. The non-transitory data storage medium of claim 26, the method further comprising:

forwarding the selection information to at least a second one of the plurality of access control checkpoint components;

forwarding identification information for the individual associated with the selection information to the at least the second one of the plurality of access control checkpoint components;

capturing an image of the individual with an image capture device associated with the first one of the plurality of access control checkpoint components; and forwarding the captured image of the individual with the identification information for the individual associated with the selection information to the at least the second one of the plurality of access control checkpoint components.

* * * * *